UNITED STATES PATENT OFFICE.

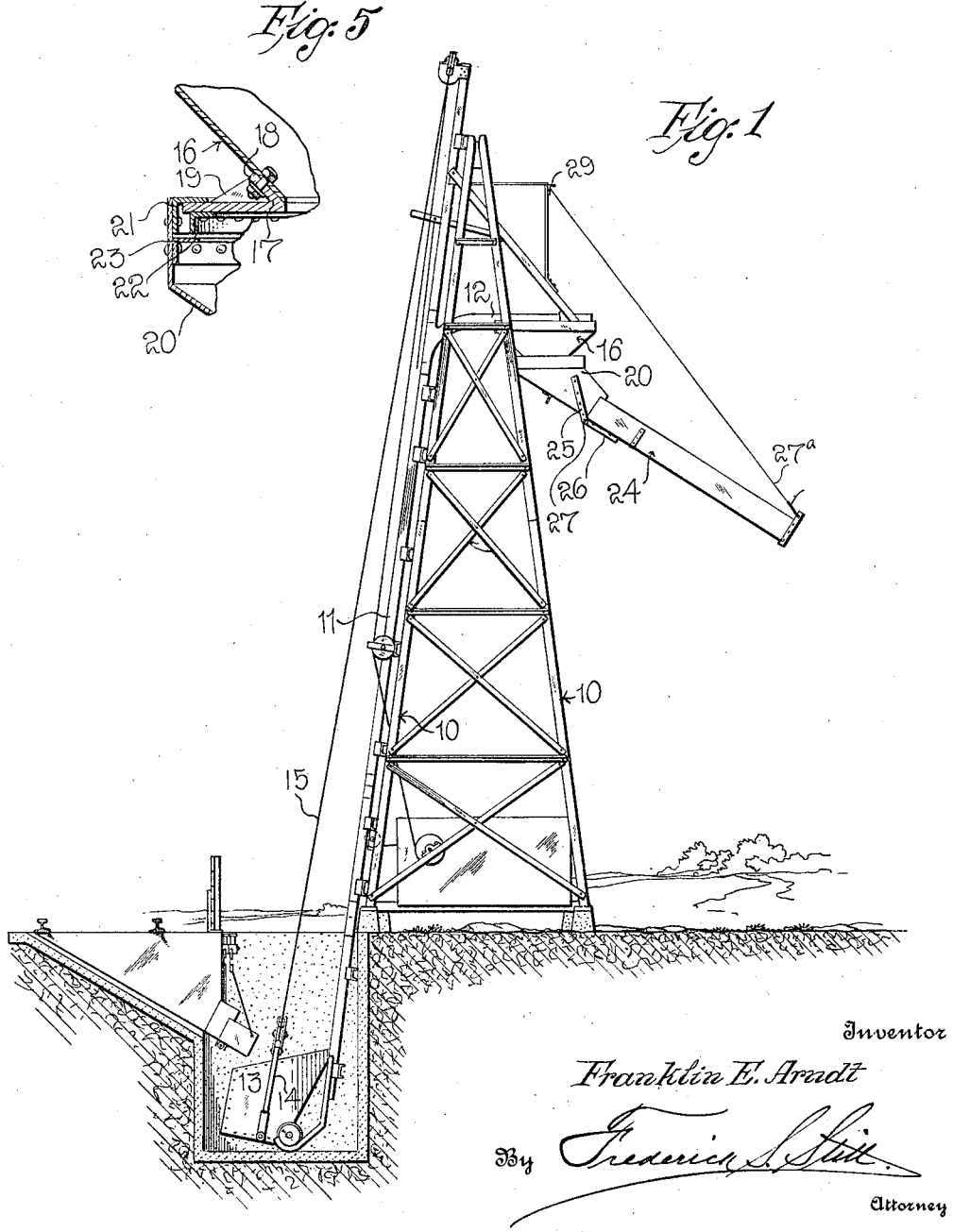

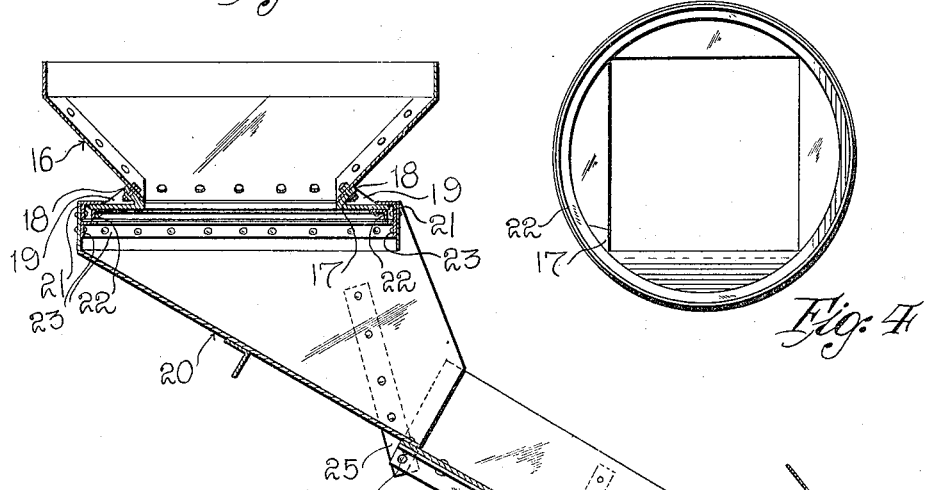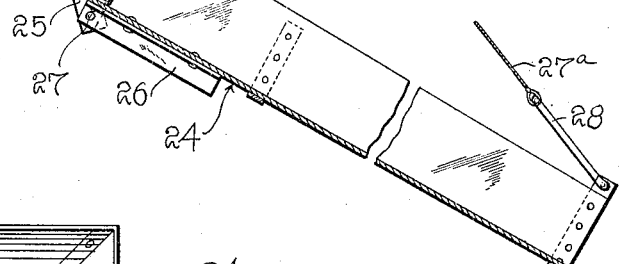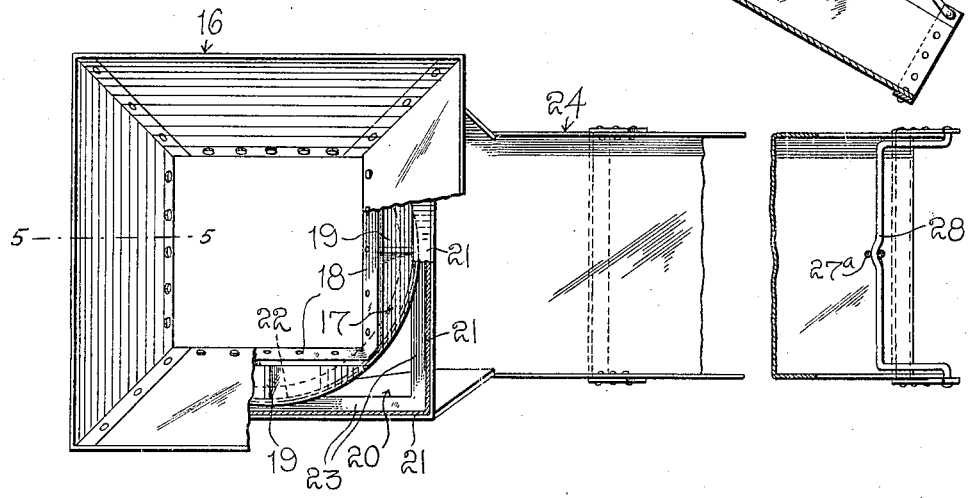

FRANKLIN E. ARNDT, OF GALION, OHIO, ASSIGNOR TO THE GALION IRON WORKS & MFG. CO., OF GALION, OHIO, A CORPORATION OF OHIO.

MATERIAL ELEVATING TOWER AND DISCHARGE CHUTE.

1,318,472.   Specification of Letters Patent.   Patented Oct. 14, 1919.

Application filed February 24, 1919. Serial No. 278,815.

*To all whom it may concern:*

Be it known that I, FRANKLIN E. ARNDT, a citizen of the United States, residing at Galion, in the county of Crawford and State of Ohio, have invented certain new and useful Improvements in Material Elevating Towers and Discharge Chutes, of which the following is a specification.

This invention relates to apparatus for elevating materials, and particularly to that class of apparatus of this character wherein there is provided a tower, a hopper with a discharge chute, and means for elevating materials and discharging the materials into the hopper.

The general object of my invention is to provide a construction of this character wherein the discharge chute is operatively connected to the hopper so that it may be rotated to thereby direct the chute into a plurality of discharge positions.

And a further object is to provide a construction of this character wherein the chute is formed of two sections, one of the sections being pivoted to the other section so that the chute may be adjusted to discharge at various elevations as well as to swing in a horizontal plane.

A further object is to provide improved means for operatively connecting the upper portion of the swinging chute to the hopper for rotary movement, which means will prevent the chute from tipping.

Other objects will appear in the course of the following description.

My invention is illustrated in the accompanying drawings, wherein—

Figure 1 is a side elevation partly broken away of an unloading chute constructed in accordance with my invention, the pit wall being in section;

Fig. 2 is a front elevation of the unloading chute; and

Fig. 3 is a section on the line 3—3 of Fig. 2.

Fig. 4 is an under side plan view of the angle iron 17;

Fig. 5 is an enlarged fragmentary vertical sectional view through the hopper 16 and the section 20 of the delivery chute.

Referring to these drawings, it will be seen that I provide a tower or derrick composed of four upwardly extending, supporting members 10 joined to each other by braces of any suitable construction and resting upon a suitable foundation. Attached to the structure upon one face thereof are upwardly extending channel irons 11 having their channels facing toward each other and extending forward from these channel irons adjacent the upper end of the tower are the pairs of dump tracks 12 which form a continuation of the channel. Operating between the channel irons 11 is a bucket 13 having wheels which run upon the channel irons 11 and having at the upper end of the bucket, members which extend in to the channel irons. The bucket is carried by a yoke 14 from which extends a cable 15 which extends over the top of the tower passing over the pulleys mounted in the upper end of the tower and then passing downward to any suitable hoisting engine. When the bucket moves up under the action of the cable, the open upper end of the bucket will be guided laterally by the tracks 12 and the lower end of the bucket will be raised so that the bucket will thus be overturned to discharge its contents. Then a reverse movement is imparted to the cable 15 and the bucket moves back to its original receiving position. The bucket discharges into a hopper 16. All the parts which I have heretofore described are well known and form no part of my invention.

The hopper 16 is square in plan view, but it may be circular if desired, and has downwardly and inwardly extending sides. Attached to these side walls at the lower end of the hopper 16 is a circular angle iron 17 having an upwardly and outwardly extending flange 18 which is bolted or riveted to the lower margin of the hopper 16 and a horizontally extending flange which is relatively wide and connected at intervals to the flange 18 by means of webs 19.

Disposed below the hopper 16 is the upper section 20 of a chute. The upper end of this chute is rectangular in plan view, and the side walls of the upper end of the chute at the upper margin of this chute section 20 are provided with the angle irons 21, the upper flange of each angle iron extending horizontally inward and resting upon the margin of the horizontal flange of angle iron 17. Thus, it will be seen that this section 20 may be shifted around the vertical axis of the hopper 16, and in order to prevent the section 20 from tipping relative to the hopper 16, I attach to the under face of the horizontal flange of the track formed by angle iron 17, the angle iron 22 providing a vertical flange disposed adjacent the margin of the angle iron 17, and attached to the inner face of the vertical walls of the section 20 are the angle irons 23, the horizontal flanges of which are disposed just below the vertical flanges of the angle irons 21 and 22. Thus, while the angle irons 23 and 22 do not so closely engage with each other as to prevent the easy rotation of the chute section 20 upon the hopper, yet these angle irons 22 and 23 prevent the chute section 20 from undue tipping.

The chute section 20 has bottom and side walls, the bottom being inclined downward and outward, and this chute section discharges into a section 24 which may be of any desired length and which is preferably rectangular in cross section, the side walls of the chute section 24 being pivoted to the chute section 20. To this end, I have illustrated strap irons 25 riveted or otherwise attached to the side walls of the chute section 20 and projecting below the same, and have illustrated the side walls of the section 24 at the upper end of the section as being formed with the downward extensions 26 through which a pivot bolt 27 passes, this bolt 26 passing through the strap irons 25. The detailed construction of the chute section 24 may be of any usual and suitable character, and as this form of chute is well known, there is no necessity of describing it.

The free end of the chute is supported by means of a cable 27 which is attached to the free end of the chute by means of a yoke 28, and this cable may extend up to a cross bar 29 or to any other desired portion of the supporting structure.

It will be seen that with this construction, the spout or chute can be set to discharge material from the hopper either in a pile or in a series of piles from the extreme right side of the machine to the extreme left side of it, and the free end of the spout or chute can be raised or lowered without causing it to interfere or bind at the upper end where the chute has its connection with the hopper.

It will be seen that the construction which I have described is very simple and thoroughly effective and that by the means which I have illustrated, a chute section which is rectangular in plan may be connected to a hopper section likewise rectangular in plan so that the chute or spout may be rotated in a horizontal plane to direct the material to any desired point and that the chute or spout may be raised or lowered to suit exigencies of operation without affecting in any manner the freedom of rotation of the upper end of the chute section.

The connection between the chute section 20 and the hopper 16 formed by the angle iron 17 and the angle irons 21 is such that the chute section may be readily assembled upon the hopper. Thus, if only three sides of the chute section 20 are provided with the angle irons 21, it is an easy matter to slip the chute section 20 into place upon the circular track formed by the angle iron 17. After it is slipped into place, the fourth angle iron 21 may be bolted or riveted to the fourth side of the hopper 20 so as to close this side, and in that case the section 20 will be supported at four equi-distant points upon the hopper with a free movement of rotation therearound. On the other hand, when it is desired to disassemble the parts, it is an easy matter to remove one of the angle irons 21 and slide the section 20 out of its engagement with the circular angle iron 17. This construction provides a very practical means for connecting the chute section 20 of the swinging spout to the hopper in an economical manner and with a considerable saving in the cost of construction, both as regards material and labor. The means described makes it a very simple matter to apply to the circular angle iron 17, the square chute or spout section 20.

I have found in practice that this construction is very convenient for the purpose of discharging material either in one pile or several piles. The tower operates in connection with a dumping pit into which the bucket descends, and means for discharging material from cars into the pit.

I claim:—

1. An apparatus of the character described including a tower, a receiving hopper mounted thereon and rectangular in plan, the lower end of the hopper having an outwardly extending flange, the periphery of the flange being circular, a chute section coacting with the hopper and rectangular in plan and having three side walls, and angle irons attached to the inner faces of said side walls and having flanges extending inward over and resting upon the flange of the hopper whereby said chute section is rotatably mounted upon the hopper.

2. A structure of the character described including a tower, a hopper mounted thereon, an angle iron attached to the side wall of the hopper and having an outwardly projecting flange forming a track, the periphery of the flange being circular, a chute section coacting with the hopper, rectangular in plan and having three side walls, an angle iron attached to each side wall and having an inwardly extending horizontal flange engaging at its middle over the horizontal flange of the first named angle iron, an angle iron attached to the under face of the track iron and having a vertical flange extending downwardly therefrom, and an angle iron attached to the side wall of the chute section and having a horizontal flange projecting inward and extending beneath the lower edge of the last named angle irons in contiguity therewith.

3. A structure of the character described including a tower, a hopper mounted thereon, an angle iron attached to the side wall of the hopper and having an outwardly projecting flange forming a track, the periphery of the flange being circular, a chute section coacting with the hopper, rectangular in plan and having three side walls, an angle iron attached to each side wall and having an inwardly extending horizontal flange engaging at its middle over the horizontal flange of the first named angle iron, an angle iron attached to the under face of the track angle iron and having a vertical flange extending downwardly therefrom, an angle iron attached to the side wall of the chute section and having a horizontal flange projecting inward and extending beneath the lower edge of the last named angle irons in contiguity therewith, supporting irons attached to the side wall of the chute section and extending downwardly and outwardly with relation thereto, and a second chute section into which the first named chute section discharges and pivoted to said supporting irons whereby the second named chute section may be vertically adjusted, and a supporting cable attached to the free end of the second named chute section.

4. A structure of the character described including a receiving hopper, the lower end of the hopper having an outwardly extending flange, the periphery of the flange being circular, and a chute section connected to the hopper and into which it discharges, said chute section being rectangular in plan and having three side walls, and angle irons attached to the inner face of said side walls and disposed in rectangular relation and having horizontal flanges extending inward over and resting upon the flange of the hopper whereby said chute section is rotatably mounted upon the hopper.

5. A structure of the character described including a receiving hopper, the lower end of the hopper having an outwardly extending flange, the periphery of which is circular, a chute section coacting with the hopper and into which it discharges, the chute section being rectangular in plan and having three side walls disposed exteriorly to the periphery of the circular flange, angle irons attached to the inner faces of said side walls, disposed in approximately rectangular relation and having horizontal flanges extending inward over and resting upon the circular flange of the hopper, whereby said chute section is rotatably mounted upon the hopper and an angle iron attached to the under face of said circular flange and extending downwardly therefrom, and an angle iron attached to the side wall of the chute section and having a horizontal flange projecting inward and extending beneath the lower edge of the last named angle iron and in approximate contiguity therewith.

In testimony whereof I affix my signature.

FRANKLIN E. ARNDT.

Copies of this patent may be obtained for five cents each, by addressing the "Commissioner of Patents, Washington, D. C."